United States Patent

[11] 3,605,094

[72] Inventor Salvador J. Peperone
  Silver Spring, Md.
[21] Appl. No. 886,274
[22] Filed Dec. 18, 1969
[45] Patented Sept. 14, 1971
[73] Assignee The United States of America as
  represented by the Secretary of Army

[54] FREQUENCY MODULATED RANGING DEVICE
  2 Claims, 7 Drawing Figs.
[52] U.S. Cl. ............................................. 343/14,
  343/17.5
[51] Int. Cl. ............................................. G01s 9/24
[50] Field of Search ............................................. 343/14,
  17.5

[56] References Cited
  UNITED STATES PATENTS
3,108,273 10/1963 Erst .............................. 343/14

| | | | |
|---|---|---|---|
| 3,116,483 | 12/1963 | Fiocco | 343/14 |
| 3,353,147 | 11/1967 | Meeker, Jr. | 343/17.5 X |
| 3,495,243 | 2/1970 | Russell | 343/14 |

Primary Examiner—Malcolm F. Hubler
Attorneys—Harry M. Saragovitz, Edward J. Kelly, Herbert Berl and J. D. Edgerton ABSTRACT: A frequency-modulated continuous-wave radar system virtually insensitive to targets beyond a predetermined range utilizes a delayed sample of the transmitted energy to mix with the reflected energy received. The mixer produces a difference frequency which is then separately mixed with quadrature components of the continuous wave carrier. The resultant signals are filtered to remove all but the Doppler components and then combined to yield a Doppler signal representing a target within the desired range.

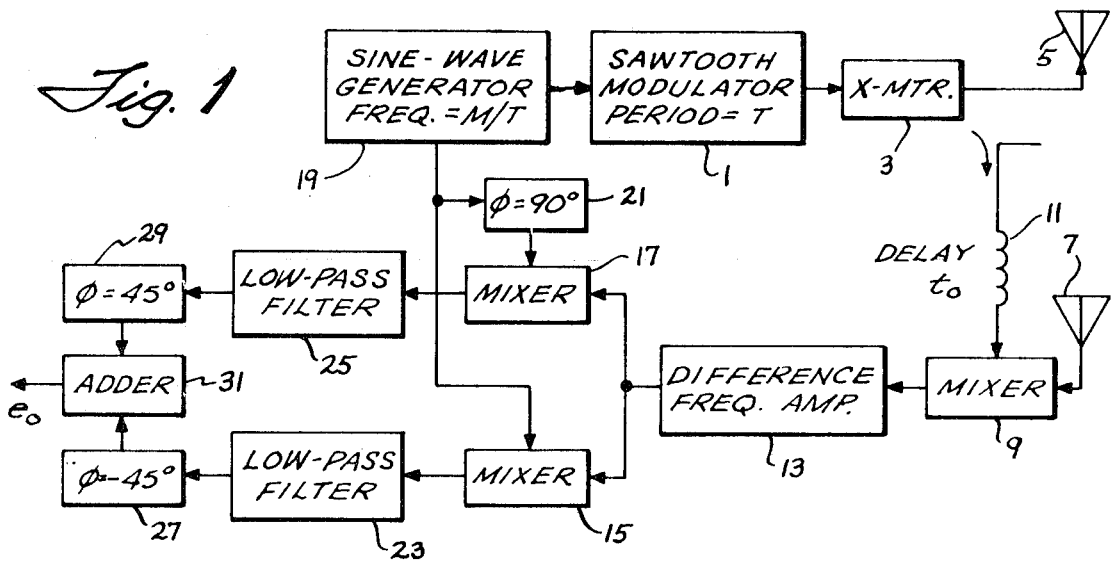
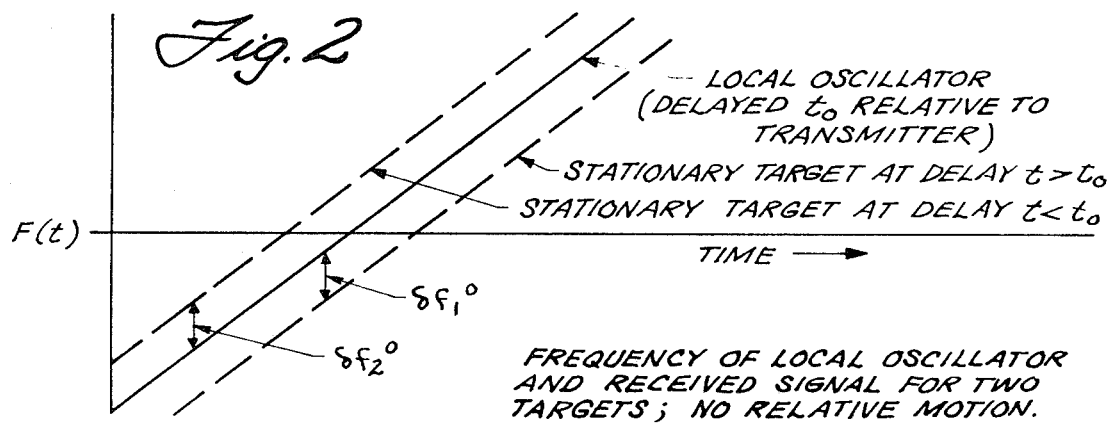
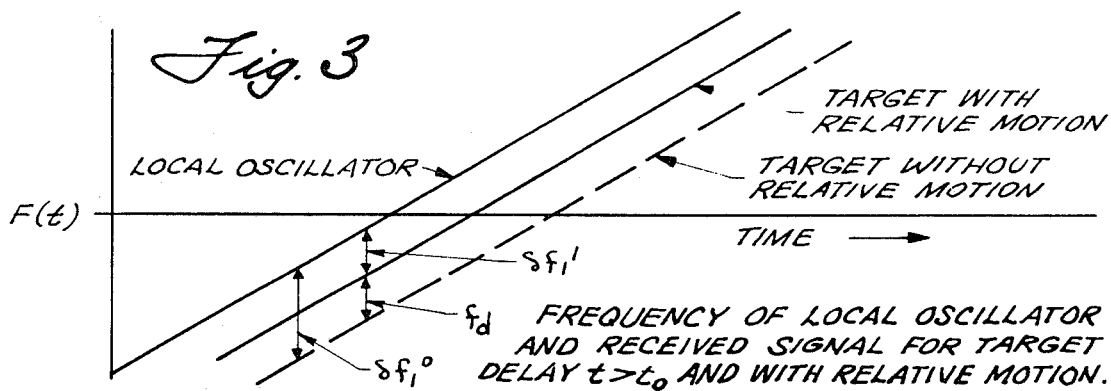

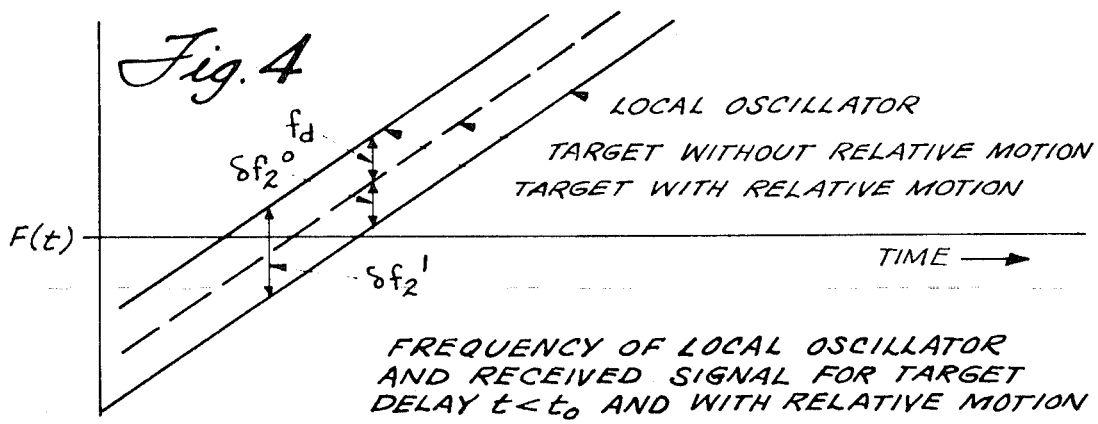
FREQUENCY OF LOCAL OSCILLATOR AND RECEIVED SIGNAL FOR TARGET DELAY $t < t_0$ AND WITH RELATIVE MOTION
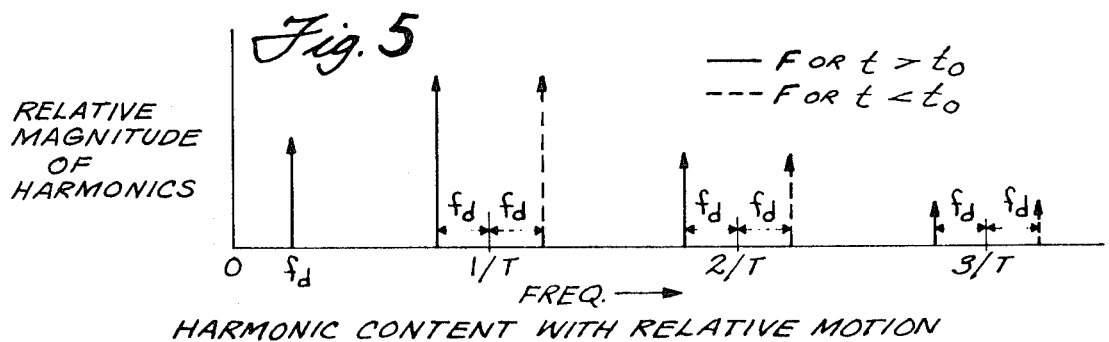
HARMONIC CONTENT WITH RELATIVE MOTION
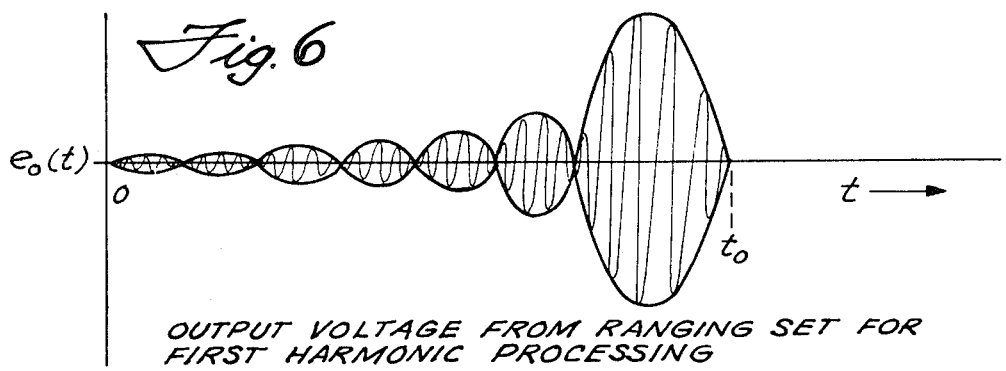
OUTPUT VOLTAGE FROM RANGING SET FOR FIRST HARMONIC PROCESSING
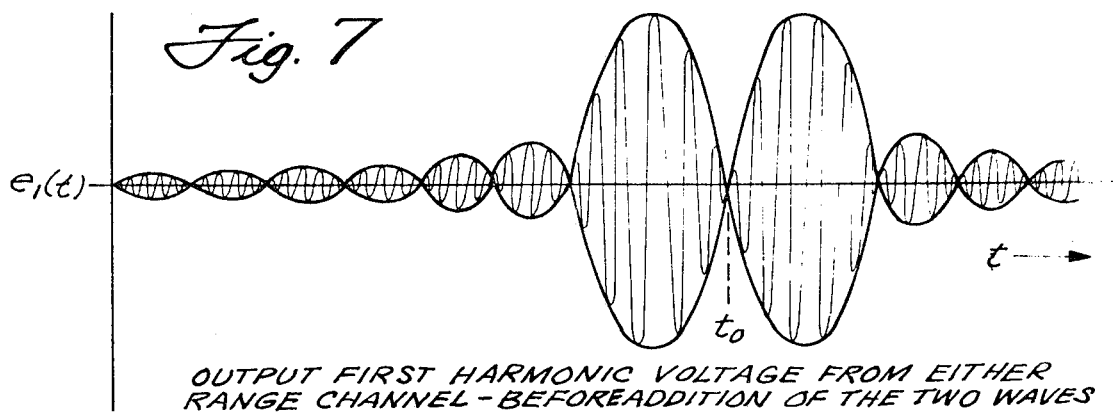
OUTPUT FIRST HARMONIC VOLTAGE FROM EITHER RANGE CHANNEL - BEFORE ADDITION OF THE TWO WAVES

FREQUENCY MODULATED RANGING DEVICE

BACKGROUND OF THE INVENTION

This invention relates to a radar system which employs a frequency-modulated continuous-wave signal in a ranging device which has virtual freedom from response to targets beyond or within some specified range.

Radar systems have long been utilized to provide indications of the location of objects throughout the entire range of the radar apparatus. Such a radar apparatus provides a signal return from all targets within the range of the transmitted signal. These systems conventionally employ pulse techniques.

Many applications call for a ranging device which will provide information limited to a desired range and exclude any system response to targets outside of such range. It may be desirable to eliminate targets which are near to the apparatus while receiving information from more distantly located targets; or, conversely, it may be desirable to eliminate response from distant targets while receiving information from those targets near the apparatus. Previous attempts have been made to produce range-limited radar systems, and one such system is described in U.S. Pat. No. 3,108,273 issued on Oct. 22, 1963 to Stephen J. Erst. The present invention is an improvement over the Erst system in eliminating response to unwanted targets.

SUMMARY OF THE INVENTION

The present invention is directed toward a radar system which obtains virtual freedom from response to targets beyond some specified range by utilizing a frequency-modulated continuous-wave signal which is transmitted to and reflected back from both wanted and unwanted targets within the range of transmission. In the receiver portion of the system signals from the unwanted targets are eliminated by a cancellation process. A portion of the signal to be transmitted is delayed a predetermined amount corresponding to a desired cutoff target range and this delayed portion is mixed with the reflected signal received to produce a difference frequency signal. This difference signal is then separately mixed with quadrature components of the continuous-wave carrier. Low-pass filters are utilized to remove all but the Doppler components from the separate mixer outputs and a 90° phase shift is introduced between the outputs from the low-pass filters. The resultant signals are combined to produce a Doppler frequency output signal corresponding to an object within the desired system range. Since this is accomplished through linear processing of the received signals the system's response to the desired signal is not affected by the simultaneous presence of undesired signals which may result from targets outside of the desired range.

BRIEF DESCRIPTION OF THE DRAWINGS

FIG. 1 is a block diagram of a system embodying the invention;

FIG. 2 is a graph of the frequencies of the local oscillator and received signal for two targets having delays greater and less than the desired cutoff range and with no relative motion;

FIG. 3 is a graph of the frequencies of the local oscillator and received signal for a target producing a delay greater than the desired cutoff range;

FIG. 4 is a graph of the frequencies of the local oscillator and received signal for a target producing a delay less than the desired cutoff range;

FIG. 5 is a graph showing the harmonic content of the received signal with relative motion;

FIG. 6 is a graph of the output voltage of the system for the case of detecting the first harmonic; and FIG. 7 is a graph of the signal voltage in either of the low-pass filter channels of FIG. 1 prior to combining in the adder circuit.

DESCRIPTION OF THE PREFERRED EMBODIMENT

The system of the preferred embodiment is shown in FIG. 1. A sawtooth modulator 1 is utilized to drive transmitter 3 and produce a frequency-modulated continuous-wave signal which is radiated by transmitting antenna 5. The radiated signal will be reflected by targets within the system range, and the reflected energy will be received by receiving antenna 7. Antenna 7 fees the local oscillator or mixer 9 where the reflected signal is mixed with a portion of the transmitted signal which is delayed a predetermined amount corresponding to the desired cutoff range by delay line 11.

When there is no relative motion between the system and the target the instantaneous frequencies of the local oscillator and of targets both within and beyond the cutoff range are as shown in FIG. 2. Without relative motion and for any target delay the difference frequency signal $\delta f_{1,2}°$, which is derived after mixing in mixer 9 consists only of harmonics of the modulation frequency $f_m = 1/T$.

When there is relative motion between the system and the target, as with an approaching target, and with target delay $t > t_0$, the difference frequency signal $\delta f_1'$ will be shifted down by an amount equal to the Doppler frequency $f_d$ as shown in FIG. 3. This means that each of the harmonic frequencies will be shifted down by an amount equal to the Doppler frequency $f_d$, assuming that the target delay is much less than the period of sawtooth modulator 1.

FIG. 4 illustrates another condition with relative motion between the system and target with target delay $t < t_0$. Here the difference frequency signal $\delta f_2'$ will be increased as shown. This means that after the target has moved through the $t_0$ delay each harmonic frequency is shifted up by an amount equal to the Doppler frequency.

FIG. 5 shows the frequency displacement of a moving target for the relative cases of $t > t_0$ and $t < t_0$. In the case of $t > t_0$ the difference frequency signal is decreased in frequency by an amount equal to the Doppler frequency $f_d$ as compared to the same target without relative motion. In the case of $t < t_0$ the difference frequency signal is increased in frequency by an amount equal to the Doppler frequency $f_d$ as compared to the same target without relative motion.

The difference frequency signal obtained from mixer 9 is amplified in difference fequency amplifier 13 and fed into mixers 15 and 17 which are located in two different channels of the first harmonic processing stage. A signal from sinewave generator 19 is fed into mixer 15 and into mixer 17 through a 90° phase shifter 21. The outputs of mixers 15 and 17 now contain quadrature components. Low-pass filters 23 and 25 are tuned to pass only the Doppler frequency components present, and, consequently, the outputs from low-pass filter 23 and 25 are Doppler frequency signals whose amplitudes are directly proportional to the strength of the first harmonic corresponding to that time delay. The Doppler signals are also in phase quadrature, and an additional 90° phase shift between channels as introduced by 45° phase shifters 27 and 29 will enable cancellation by combining the signals in adder 31. However, after passing through the $t_0$ delay these two signals will be in-phase and will add to give full output subsequent to passing through the $t_0$ delay. The output voltage for the case of detecting the first harmonic would then trace out the pattern shown in FIG. 6 as long as $f_d < 1/2T$.

The improved rejection may be seen by comparing FIGS. 6 and 7. Since the amplitude of each harmonic is a modified sin $x/x$ function of range, the detection of any one Doppler-shifted harmonic line would result in at least some response to targets at virtually all ranges.

What is claimed is:

1. A radar system comprising
   a continuous-wave signal source;
   means for frequency modulating a signal from said continuous-wave signal source;
   means for transmitting said frequency-modulated signal;

means for receiving said transmitted signal reflected from a distant object;

means for delaying a portion of said signal to be transmitted;

first means for mixing said delayed signal and said reflected signal to produce a difference frequency signal;

second means for mixing said difference frequency signal with a signal from said continuous-wave signal source;

third means for mixing said difference frequency signal with a signal from said continuous-wave signal source shifted 90° in phase;

first and second low-pass filter means coupled to said second and third mixing means and tuned to pass only the Doppler frequency components of the signal;

means for introducing a 90° phase shift between the outputs of said first and second low-pass filters; and means to combine the outputs of said first and second low-pass filters to produce a Doppler frequency output signal corresponding to an object within the desired system range while eliminating signals from objects not within the desired system range.

2. A frequency-modulated continuous-wave radar system comprising a continuous-wave signal source;

means for frequency-modulating the signal from said continuous-wave signal source with a sawtooth waveform signal;

means for transmitting the frequency modulated signal;

means for receiving said frequency modulated signal reflected from a distant object;

means for delaying a portion of the frequency modulated signal to be transmitted a predetermined amount corresponding to a desired cutoff target range;

first means for mixing said reflected signal with said delayed signal to produce a difference frequency signal;

second and third mixing means;

means coupling a signal from said continuous wave signal source to each of said second and third mixing means in quadrature;

means coupling said difference frequency signal to each of said second and third mixing means, first and second low-pass filter means coupled to said second and third mixing means and tuned to pass only the Doppler frequency components of the signal;

means for introducing a 90° phase shift between the outputs of said first and second low-pass filters; and means to combine the outputs of said first and second low-pass filters to produce a Doppler-frequency output signal corresponding to an object within the desired system range while eliminating signals from objects not within the desired system range.